United States Patent
Sommerfeldt et al.

(10) Patent No.: US 6,210,509 B1
(45) Date of Patent: Apr. 3, 2001

(54) METHOD OF SHEET LAMINATING

(75) Inventors: Frank A. Sommerfeldt, New Richmond, WI (US); James B. Jornlin, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 836 days.

(21) Appl. No.: 08/501,769

(22) Filed: Jul. 13, 1995

(51) Int. Cl.[7] .................................................. B32B 31/04
(52) U.S. Cl. ............................................ 156/152; 156/285
(58) Field of Search ........................... 156/580, 581, 156/583.8, 286, 344, 247, 488, 492, 249, 583.1, 152, 229, 285; 100/233, 238, 210, 93 P, 93 RP

(56) References Cited

U.S. PATENT DOCUMENTS

| | | |
|---|---|---|
| 1,206,656 | 11/1916 | Benedictus . |
| 2,084,625 * | 6/1937 | Stebbins et al. ................... 156/152 |
| 2,624,389 | 1/1953 | Bungay ................................ 154/1 |
| 2,745,463 | 5/1956 | Rempel ................................ 154/1 |
| 2,850,072 | 9/1958 | Bryans ................................ 154/1 |
| 3,146,485 * | 9/1964 | Evans et al. ....................... 156/152 |
| 3,492,182 * | 1/1970 | Howard .......................... 156/249 X |
| 3,666,603 | 5/1972 | Kuhns et al. ...................... 156/583 |
| 3,873,395 * | 3/1975 | Ehrlich ............................... 156/382 |
| 3,923,590 | 12/1975 | Humphries ........................ 156/580 |
| 4,028,166 | 6/1977 | Leonhart ........................... 156/382 |
| 4,078,962 | 3/1978 | Krueger ............................. 156/497 |
| 4,220,491 * | 9/1980 | Metcalf et al. ................ 156/580 X |
| 4,367,107 * | 1/1983 | Valimont et al. ................ 156/364 |
| 4,415,395 * | 11/1983 | Paque ............................ 156/581 X |
| 4,495,013 * | 1/1985 | Walker et al. ................. 156/582 X |
| 4,927,479 * | 5/1990 | Bock ........................... 156/583.1 X |
| 5,051,147 | 9/1991 | Anger ................................ 156/355 |
| 5,092,954 * | 3/1992 | Braun et al. .................. 156/247 X |
| 5,098,508 * | 3/1992 | Mattil ........................... 156/556 X |
| 5,147,496 | 9/1992 | Hix ................................. 156/583.8 |
| 5,167,750 | 12/1992 | Myers ............................ 156/583.9 |
| 5,264,069 * | 11/1993 | Dietrich et al. ............... 156/556 X |
| 5,327,827 | 7/1994 | Richardson ...................... 101/126 |

FOREIGN PATENT DOCUMENTS

| | | | |
|---|---|---|---|
| 38 37 516 | 5/1990 | (DE) | ........................... A43D/5/02 |
| 2-308217 * | 12/1990 | (JP) | ............................... 156/580 |
| 5-330001 | 12/1993 | (JP) | ........................... B32B/31/04 |
| 9302292 | 12/1993 | (NL) | ........................... B42D/15/02 |
| WO 85/01913 | 5/1985 | (WO) | .......................... B29D/9/00 |

* cited by examiner

*Primary Examiner*—Curtis Mayes
(74) *Attorney, Agent, or Firm*—Peter L. Olson

(57) ABSTRACT

Methods and devices for laminating a sheeted topfilm to a sheeted substrate while achieving substantial control over registration between the topfilm and the substrate and reducing the formation of lamination defects.

8 Claims, 4 Drawing Sheets

METHOD OF SHEET LAMINATING

FIELD OF THE INVENTION

The present invention relates to the field of devices and methods for laminating two or more sheets of material. More particularly, the present invention relates to the field of devices and methods for laminating a sheeted topfilm to a sheeted substrate while holding the topfilm in tension and maintaining registration between the topfilm and the substrate.

BACKGROUND OF THE INVENTION

The laminating of a topfilm to a substrate is well known. One particular application is in the lamination of topfilms to substrates to produce laminated blanks used for vehicles license plates, traffic signs and related objects. Where high speed output is desired, the lamination process is typically performed on web-fed equipment in which the topfilm and substrate are fed from large rolls and laminated by nip rolls. After the lamination process, the laminated webs can be run through a sheeter or otherwise processed to obtain the laminated blanks used for signs, license plates, etc.

Web-fed processes offer particularly high levels of control over the lamination process, as the speed of the webs can be independently controlled, thereby also controlling the tension in those webs, which can be critical to maintain registration and reduce waste. One disadvantage is, however, that for relatively short runs where small numbers of products are needed, web-fed processes can result in substantially increased waste when measured as a percentage of product produced in the run. This additional waste can be attributed to many factors, but is primarily the result of waste produced during set-up procedures.

Such short runs are often encountered in situations in which a relatively small number of laminated blanks are needed, such as small states in the United States of America, or when any governmental unit which must produce laminated blanks for license plates, signs, etc. in volumes insufficient to justify a high speed web-fed lamination line based on both the increased waste generated as well as the high capital costs associated with the equipment.

Current technology available to produce laminate blanks for license plates, signs, etc. in low volumes typically involve vacuum lamination devices which use vacuum to provide pressure for lamination or manually-operated nip roll stacks into which a sheeted topfilm and a sheeted substrate are fed. Those devices are, however, typically slow, requiring a significant amount of labor per piece part and can result in a significant amount of waste due to poor registration control.

As a result, a need exists for a low-volume, lamination process and devices for laminating a sheeted topfilm to a sheeted substrate.

SUMMARY OF THE INVENTION

The present invention provides a method and devices for laminating a sheeted topfilm to a sheeted substrate while achieving substantial control over registration between the topfilm and the substrate and reducing the formation of lamination defects.

The invention accomplishes that by allowing the operator to register the sheets before lamination and then performs the lamination process while maintaining registration. Registration is maintained by laminating only a portion of the sheets together in a contact patch and then advancing that contact patch over the surface of the sheets to produce a laminated blank.

In addition, the topfilm is held in tension during lamination, which assists in maintaining registration between the sheets, and also reduces the formation of wrinkles, bubbles and other lamination defects common to sheet lamination processes. As a result, laminated blanks can be produced in low volumes with significantly reduced waste.

Another advantage of the present invention is that it provides the ability to produce a significant number of laminated blanks with a minimum amount of labor.

These and other features and advantages of the present invention will be apparent upon reading the detailed description which follows, along with reference to the drawings.

DETAILED DESCRIPTION OF ILLUSTRATIVE METHODS AND DEVICES ACCORDING TO THE PRESENT INVENTION

As discussed above the present invention provides methods and devices for laminating sheeted topfilms to sheeted substrates while achieving substantial control over the registration between the topfilm and the substrate.

As used herein, the adjective "sheeted" when used with topfilm or substrate indicates that the topfilm or substrate has been precut into a sheet of the size needed to form the desired laminated blank. The size of the sheets is such that either no or only minimal trimming is necessary after lamination to produce a useable laminated blank.

In general, the present invention accomplishes its advantages by, in large part, simulating the operation of web fed lamination line in which the web speed of the materials being laminated can be independently controlled to provide tension. Tension is useful to maintain registration accuracy as well as to prevent wrinkles, bubbles, and other lamination defects from occurring in the laminated blanks.

Figure 1:
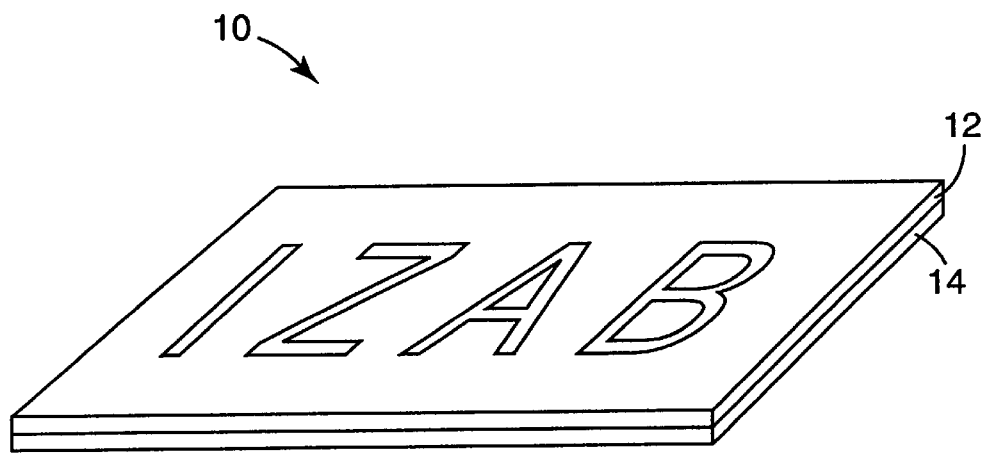
FIG. 1 is one illustrative embodiment of a laminated blank constructed according to the methods of the present invention.

Referring now to FIG. 1 where one illustrative laminated blank constructed according to the principles of the present invention is illustrated, the blank 10 comprises at least two layers including a topfilm 12 and a substrate 14. In many instances, the present invention will be used to manufacture laminated blank for license plates which include an aluminum substrate 14 and a topfilm 12 comprising a reflective sheeting with graphics and/or lettering. It will, however, be understood that the methods and devices according to the present invention can be used to manufacture laminated blanks formed of two sheeted layers for any purpose.

The topfilm 12 can be laminated to the substrate 14 using a pressure sensitive adhesive, temperature sensitive adhesive, or any other lamination mechanism well known to those skilled in the art. In general, however, the present invention is most useful with those lamination mechanisms which require in addition to other variables, pressure between the topfilm 12 and the substrate 14 to complete the lamination process.

The topfilm 12 is typically more flexible than the substrate 14 and, where control over the lamination process is insufficient, the topfilm 12 can be laminated to the substrate 14 in a way that forms bubbles between the topfilm 12 and substrate 14 or in a manner which introduces wrinkles into the topfilm 12. Both of those defects are undesirable and the methods and devices according to the present invention are extremely useful in eliminating those defects when laminating a sheeted topfilm 12 to a sheeted substrate 14.

Figure 2:
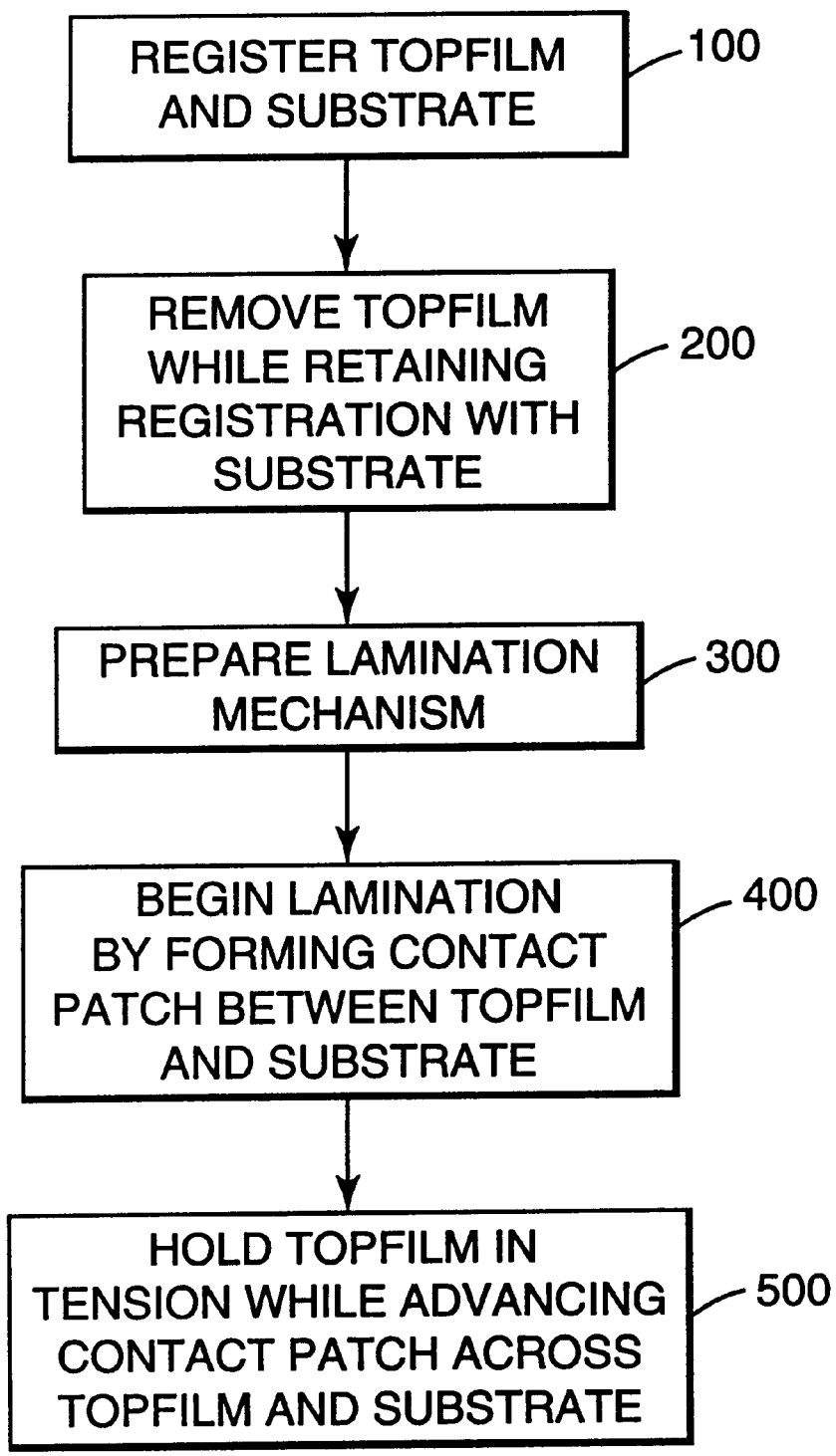
FIG. 2 is a flow chart depicting the steps of one illustrative method according to the present invention.

Turning now to FIG. 2 which is a flow chart depicting one illustrative method according to the present invention, the steps of the basic method will be described below after which illustrative devices for practicing that method will be described in more detail.

The first step in the illustrative method is to register the topfilm 12 and the substrate 14 to one another. Typically, the registration will be manual, i.e., an operator will physically align the topfilm and the substrate in the desired orientation, although jigs or fixtures could be provided to expedite and possibly increase the accuracy of the registration step.

After registration, the method involves the step of removing the topfilm from the substrate while retaining registration between the topfilm and the substrate. This is an important aspect of the present invention in that registration control is one of the advantages of the present invention, particularly when applied to sheeted topfilms and sheeted substrates for which registration control is critical to reduce waste and provide a satisfactory laminated blank.

After the topfilm has been removed from the substrate the lamination mechanism can be prepared or activated. This may involve removing a liner from a pressure sensitive adhesive which is provided on either the substrate or the topfilm or it could involve heating of the substrate and/or topfilm to activate a temperature sensitive adhesive. Other lamination mechanisms will be well known to those skilled in the art such as UV sensitive or other light activated materials, two-part resin-based systems, etc. In any event, the present invention provides a method in which registration between the topfilm and the substrate is maintained during activation or preparation of the lamination mechanism, regardless of what form it actually takes.

Figure 3:
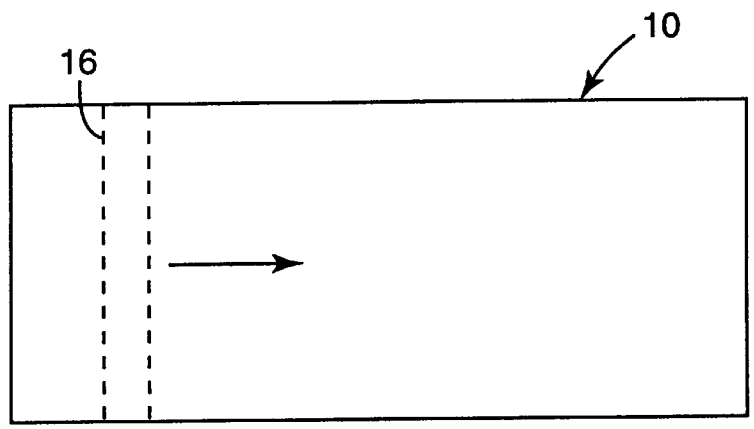
FIG. 3 is a schematic diagram depicting movement of the contact patch across a substrate according to the present invention.

After the lamination mechanism is prepared, lamination of the topfilm to the substrate can begin by forming a contact patch between the topfilm and the substrate. The contact patch is schematically illustrated in FIG. 3 which depicts these laminated blank 10 and, in dashed lines, the contact patch 16. The arrow in FIG. 3 indicates that the contact patch 16 advances across the laminated blank 10 during the lamination process.

It is preferred that the contact patch begin at one edge of the substrate 14 and topfilm 12 and advance to the opposing edge, although theoretically the contact patch 16 could be initially formed anywhere in the topfilm 12 and substrate 14 and advanced to one edge, followed by advancing it to the opposing edge.

Another step in the illustrative method according to FIG. 2 is to hold the topfilm 12 in tension while advancing the contact patch 16 across the topfilm 12 and the substrate 14. By holding the topfilm 12 in tension the formation of bubbles and/or wrinkles along with other defects can be minimized, particularly when a pressure-sensitive adhesive is used as the lamination mechanism.

In essence, the tensioning of the topfilm 12 simulates the operation of a web-fed lamination line in which the speed of one of the webs is slower relative to the other web to maintain tension during the lamination process. That tension reduces bubbles and/or wrinkles and other lamination defects. The present invention simulates that operation to provide similar advantages for sheeted topfilms laminated to sheeted substrates where the control provided by web fed machinery is not available due to the sheeted form of the topfilms and substrates.

A pair of illustrative devices which can be used to accomplish the method according to the present invention will now be described. It will, of course, be understood that many other devices may be manufactured which could accomplish the method according to the present invention and that the two illustrative embodiments described below are examples of only two variations.

Figure 4:
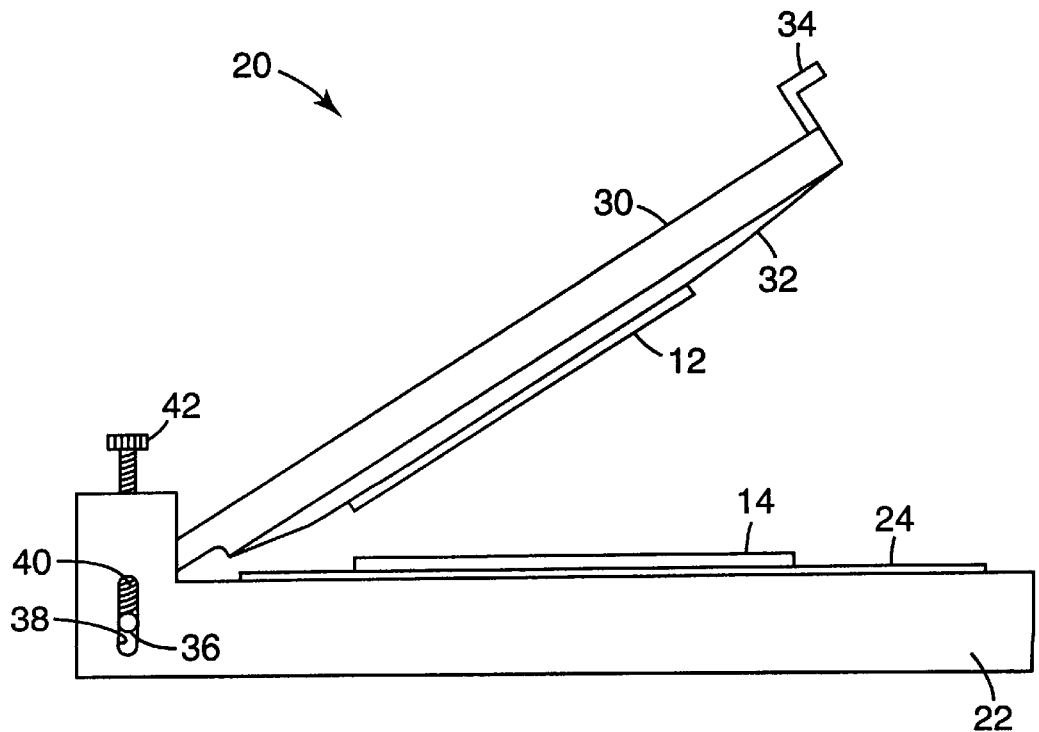
FIG. 4 is a side schematic view of one illustrative lamination device according to the present invention in its open position.
Figure 5:
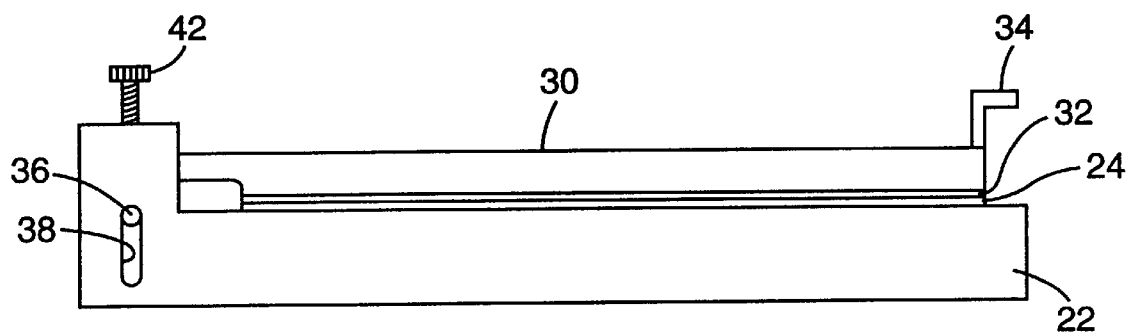
FIG. 5 is a side schematic view of the lamination device of FIG. 4 in the closed position.

FIGS. 4 and 5 depict one device 20 in its open position in FIG. 4 and closed position in FIG. 5. The device 20 includes a base 22, a bottom platen 24, a top cover 30, top platen 32, and a handle 34. The top cover 30 is hinged about an axis defined by pin 36 which is located in a slot 38 for movement in a generally vertical direction where the bottom platen 24 defines a horizontal plane.

Also shown in FIG. 4 is a substrate 14 located on bottom platen 24, and a topfilm 12 located on top platen 32. In the positions shown, FIG. 4 depicts the process according to the present invention after the topfilm 12 has been registered with the substrate 14.

After registration, topfilm 12 is raised or lifted off of substrate 14 by top platen 32. The attachment method used to retain topfilm 12 in one position against top platen 32 can be a variety of means including vacuum systems, adhesives, magnetic systems, electrostatic systems and any other mechanism which retains topfilm 12 against top platen 32, yet subsequently releases topfilm 12 after it has been laminated to substrate 14. Such systems will be well known to those skilled in the art and will not be described further herein.

It is also preferred in the illustrative embodiment of device 20 that top platen 32 comprises a somewhat resilient material provided in a generally curved profile as shown in FIG. 4. The curvature in top platen 32 enhances early formation of the contact patch 16 depicted in FIG. 3 and further enhances movement of the contact patch across topfilm 12 and substrate 14 during the lowering of top platen 32. Resilient materials useful for the surface of top platen 32 include, but are not limited to: pure gum rubber (about 40 durometer), neoprene (preferably 60–100 durometer) and silicone.

Alternatively, top platen 32 could be planar provided it was constructed of a material resilient enough to form the desired contact patch 16 as illustrated in FIG. 3 when top platen 32 is rotated about pivot point 36. In such an embodiment, it may also be desirable to move the location of pivot point 36 even farther below the plane defined by bottom platen 24 than if top platen 32 was curved as shown in FIG. 4.

The movement of pivot point 36 causes the edge of the top platen 32 nearest to the pivot point 36 to rise off of the bottom platen 24 as shown in FIG. 5. This occurs after that portion of the topfilm 12 and substrate 14 have been laminated by movement of the contact patch 16.

Another aspect of the device 20 depicted in FIG. 4 is location of pivot point 36 around which top cover 30 rotates. As shown in FIG. 4, pivot point 36 is located below the plane defined by the upper surface of bottom platen 24 when the device 20 is in its open position with the cover 30 raised. Pivot point 36 is restrained downwardly by a resilient member, such as a coil spring 40 which can be provided with a precompression or a loading by a screw 42 as generally depicted in FIG. 4.

Referring now to FIG. 5, pivot point 36 is shown in its upper-most position where it is essentially equal to the height of the upper surface of the bottom platen 24 when top cover 30 and top platen 32 are lowered to complete the lamination process. Movement of pivot point 36 upward while the contact patch 16 moves across the topfilm 12 and substrate 14 serves to provide tension in the topfilm 12 during the lamination process provided that the portion of topfilm 12 not yet laminated to the substrate 14 remains attached to the top platen 32 until lamination to the substrate 14 occurs. If the topfilm 12 releases from the top platen 32 before lamination, tension is lost and, potentially, registration is also lost along with an increased potential for the introduction of bubbles and wrinkles in topfilm 12.

It is preferred that the location of pivot point 36 begin below the plane defined by the bottom platen 24 when top platen 32 is in its open position. As top platen 32 is rotated about its pivot points 36, it is preferred that the pivot points rise. It is more preferred that the center, or axis of rotation, defined by pivot points 36 rise no higher than the plane defined by the upper surface of bottom platen 24, although, in some instances, the pivot point may rise above that plane.

It will be understood that although a compression spring 40 is shown as restraining movement of pivot point 36 from its position below the plane of the bottom platen 24 to its position equal with the plane of the bottom platen 24, pivot point 36 could alternately be restrained in tension from below pivot point 36.

In conjunction with device 20, any number of lamination mechanisms could be used to laminate topfilm 12 to substrate 14 including pressure sensitive adhesives which, in the view shown in FIG. 4, would typically require removal of a liner from topfilm 12 and/or bottom substrate 14. As discussed above, however, any suitable lamination mechanism could be used in conjunction with the device 20 to laminate the topfilm 12 to the substrate 14.

Figure 6:
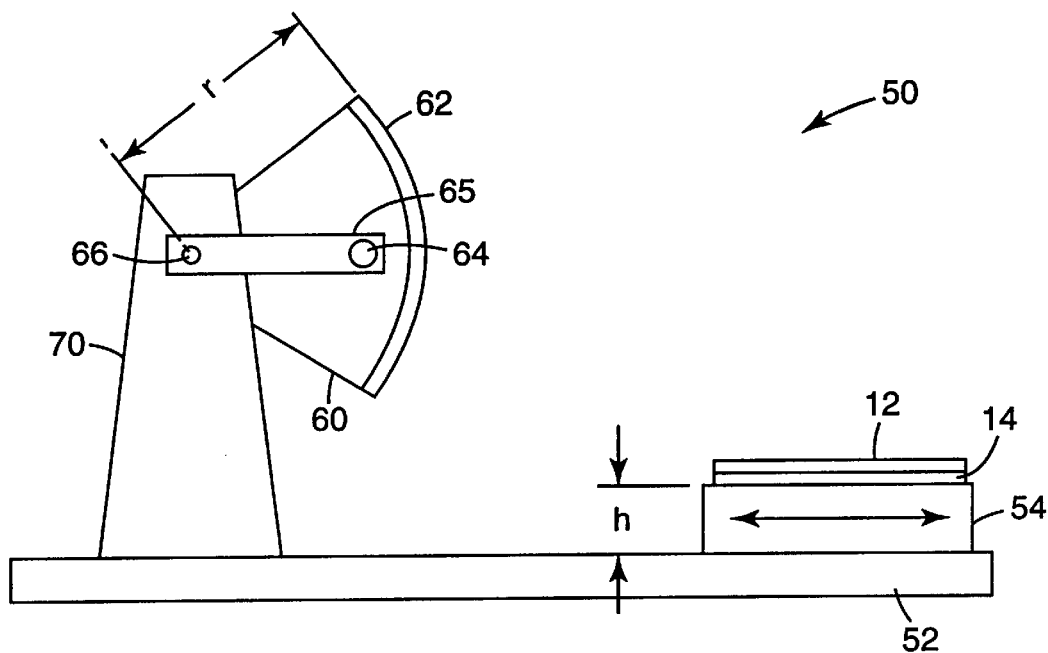
FIG. 6 is a side schematic view of another illustrative embodiment of a lamination device useful according to the present invention.
Figure 7:
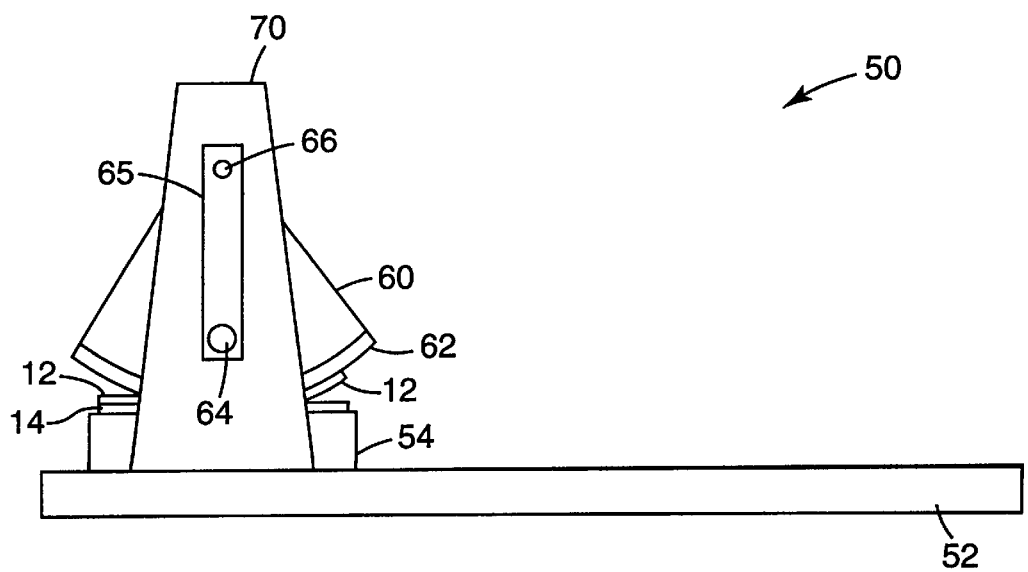
FIG. 7 is a side schematic view of the lamination device of FIG. 6 in its partially closed position.

Turning now to FIGS. 6 and 7, another illustrative embodiment of a device 50 which could be used to practice the method according to the present invention is depicted. The device 50 essentially operates on the same basic principles of device 20 depicted in FIGS. 4 & 5.

The device 50 includes a base 52, a bottom platen 54, and a top platen 62 which is attached to a rotating member 60 which rotates about an axis 66. The top platen 62 essentially takes the shape of a portion of a cylinder having a longitudinal axis running through pivot point 66.

Member 60 and top platen 62 are suspended above bottom platen 54 by a pillar 70 and are mounted for manual rotation by an operator using lever 65 and handle 64. It will, of course, be understood that top platen 62 could be rotated about pivot point 66 using any other means of rotation such as a motor, etc.

In the preferred device 50, rotation of top platen 62 about pivot point 66 also causes bottom platen 54 to move horizontally as shown by the arrow in FIG. 6. This movement can be arranged by gearing, timing belts, etc. which cause the rotational movement of top platen 62 to be converted into linear movement to move bottom platen 54. One example could involve a rack and pinion system in which the pinion is operatively coupled to the rotation of top platen 62 and the rack is operatively coupled to bottom platen 54. Many other mechanisms for converting rotary motion to linear will also be known to those skilled in the art.

It will also be understood that, in place of mechanical coupling of the rotation of top platen 62 and the longitudinal motion of the bottom platen 54, it may also be possible to control the motion of both objects separately using, for example, electric motors. The speed of each motor could be controlled separately and, in such a system, it would be optimal to control the rotational speed of the top platen 62 such that its surface speed would be lower than the longitudinal speed of the bottom platen 54. As a result, it would then be possible to introduce tension into the topfilm 12 during the lamination process.

Also as depicted in FIG. 6, bottom platen 54 supports a topfilm 12 and substrate 14 aligned on top of bottom platen 54. In the preferred device 50, top platen 62 is rotated about pivot point 66 to move bottom platen 54 underneath top platen 62 as shown in FIG. 7. This process can be used to lift the topfilm 12 off of substrate 14. As a result, the lamination mechanism used to laminate topfilm 12 to substrate 14 can be activated while maintaining registration between the two articles. The lamination mechanism used to retain topfilm 12 and substrate 14 against the top platen 62 and bottom platen 54, respectively, could be any of those described above with respect to device 20, i.e., vacuum, magnetic, etc.

After the lamination mechanism has been activated, the handle 64 is again rotated to bring top platen 62 and bottom platen 54 together to laminate topfilm 12 to substrate 14. FIG. 7 depicts that lamination process in action as it can be seen that the left side of topfilm 12 is laminated to substrate 14 while the right side of topfilm 12 has yet to be laminated to the right side of substrate 14 and is still retained against the top platen 62.

Another feature of the device 50 depicted in FIGS. 6 and 7 is the relative ease with which lamination pressure between top platen 62 and bottom platen 54 can be adjusted. That pressure can be adjusted by varying the radial distance of top platen 62 from its pivot point 66, depicted as r in FIG. 6, while maintaining the position of the upper surface of the bottom platen 54 from the fixed base 52, indicated by h in FIG. 6.

To vary the pressure between the top platen 62 and bottom platen 54 either of the variables r and/or h can be adjusted. Radial distance r can be adjusted by any number of means, although the simplest may be to vary the thickness of top platen 62 on member 60. Another adjustment useful to vary the pressure between top platen 62 and bottom platen 54 is to adjust the height, h, of bottom platen 54 above base plate 52 while holding radial distance r constant. It will, of course, be understood that many other means for varying pressure between top platen 62 and bottom platen 54 could be used in place of those specifically described herein.

In another variation of the methods and apparatus described above, it will be understood that embossing of the substrate could also take place simultaneously with the lamination of the sheeted topfilm to the sheeted substrate. Embossing is typically performed to provide a border about the laminated blank 10 to increase rigidity. In addition, a design may also be embossed into the blank 10 to further enhance rigidity and/or to increase the visual impact of graphics and/or lettering. The actual design of embossing equipment is well known to those skilled in the art and will not be described further herein.

This invention may take on various modifications and alterations without departing from the scope thereof. Accordingly, it is to be understood that this invention is not to be limited to the above-described illustrative methods and embodiments, but is to be controlled by the limitations set forth in the following claims and any equivalents thereof.

What is claimed is:

1. A method of laminating a sheeted topfilm to a sheeted substrate comprising the steps of:
   a) registering the sheeted topfilm with the sheeted substrate;
   b) removing the sheeted topfilm from the sheeted substrate, the sheeted topfilm being carried by a first platen;
   c) activating a means for laminating the topfilm and the sheeted substrate to each other;
   d) bringing a portion of the sheeted topfilm into contact with a portion of the sheeted substrate, the portions in contact defining a contact patch; and
   e) moving the first platen relative to the sheeted substrate to advance the contact patch in a propagating direction across the sheeted substrate and laminate the topfilm to the sheeted substrate while simultaneously tensioning the sheeted topfilm in the propagating direction.

2. A method according to claim 1, wherein the step of removing the sheeted topfilm from the sheeted substrate further comprises attaching the sheeted topfilm to the first platen using vacuum.

3. A method according to claim 1, further comprising the step of retaining the sheeted substrate in a fixed position on a second platen.

4. A method according to claim 3, wherein the step of retaining the sheeted substrate further comprises retaining the sheeted substrate using vacuum.

5. A method according to claim 1, wherein the first platen is generally planar and rotates about an axis, further wherein the step of moving the first platen further comprises rotating the first platen about the axis while simultaneously moving the axis in a generally orthogonal direction relative to the sheet substrate.

6. A method according to claim 5, wherein the step of moving the platen further comprises restraining the axis from moving above a plane defined by the sheeted substrate.

7. A method according to claim 1, wherein the first platen forms a portion of a cylinder, and further wherein the step of moving the first platen further comprises rotating the first platen about the axis of the cylinder while simultaneously moving the sheeted substrate in a direction generally tangential to the cylinder.

8. A method according to claim 7, wherein the step of moving the first platen further comprises moving the sheeted topfilm at a speed less than the speed of the sheeted substrate.

* * * * *